April 1, 1958 J. N. SANDBERG 2,828,714
AUTOMATIC TOAST BUTTERING DEVICE
Filed Feb. 14, 1956 2 Sheets-Sheet 1

INVENTOR.
JOHN N. SANDBERG
BY *Victor J. Evans & Co.*
ATTORNEYS

April 1, 1958   J. N. SANDBERG   2,828,714
AUTOMATIC TOAST BUTTERING DEVICE
Filed Feb. 14, 1956   2 Sheets-Sheet 2
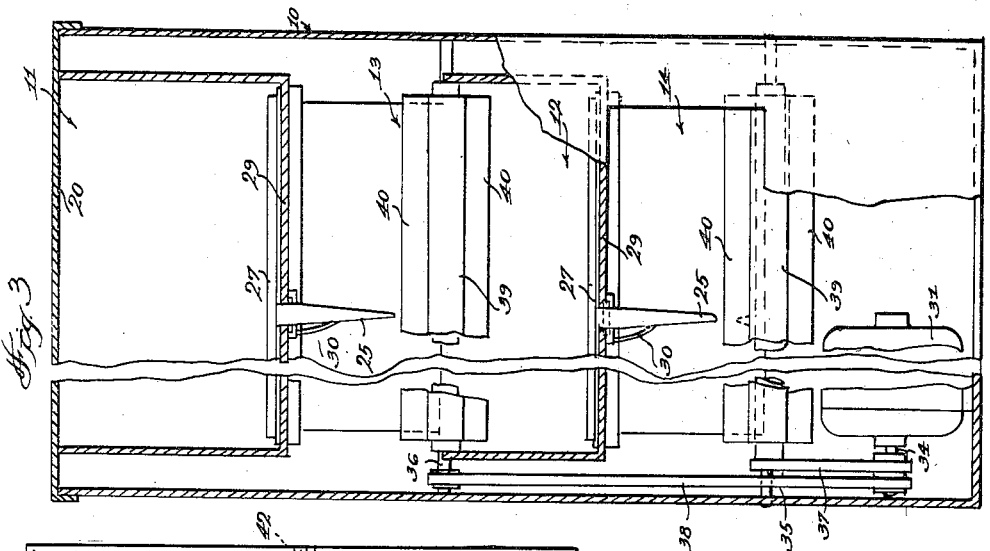
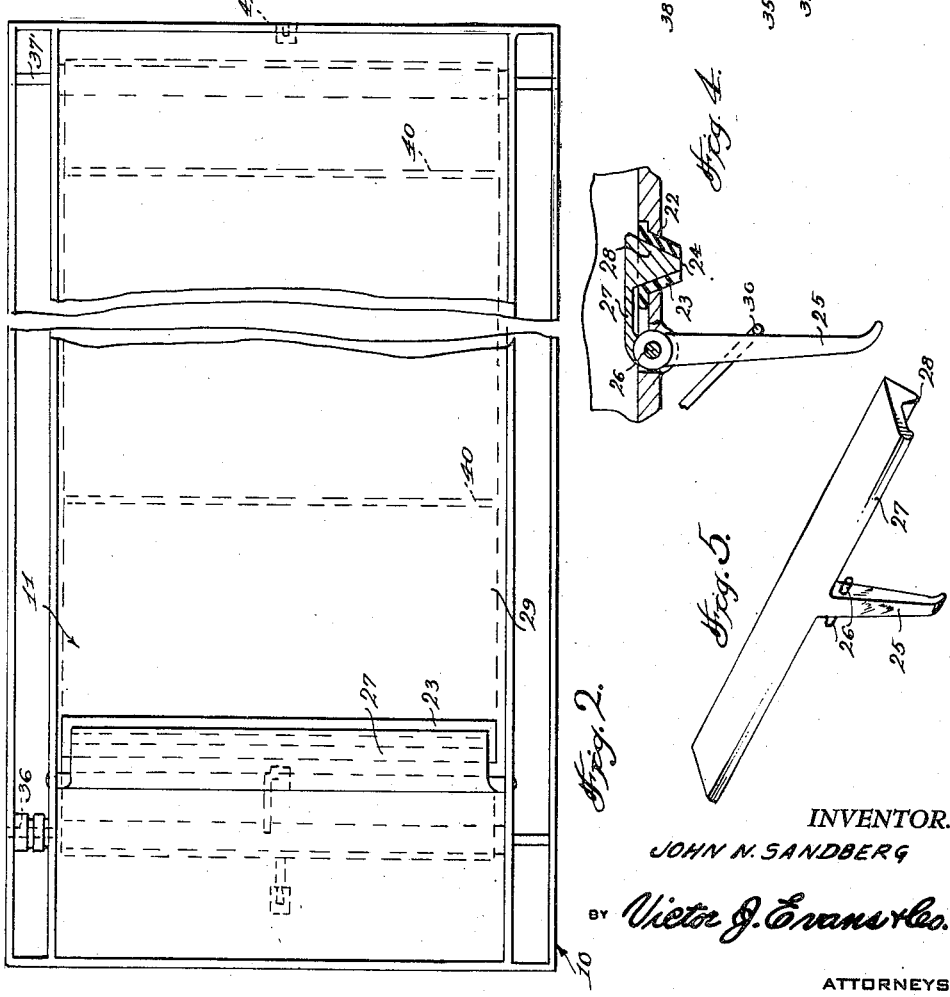
INVENTOR.
JOHN N. SANDBERG
BY *Victor J. Evans & Co.*
ATTORNEYS 2,828,714

AUTOMATIC TOAST BUTTERING DEVICE

John N. Sandberg, Bigfork, Minn.

Application February 14, 1956, Serial No. 565,379

4 Claims. (Cl. 118—2)

This invention relates to a mechanism for automatically applying material such as butter to toast, bread or the like.

The object of the invention is to provide a mechanism which will automatically apply a layer or coating of material such as butter to bread, toast or the like as the toast is moved through the mechanism.

Another object of the invention is to provide a device which will automatically spread or apply a quantity of butter to toast as the toast is automatically conveyed through the mechanism, there being switches provided for controlling the operation of the conveying mechanism as the toast passes through the device.

A further object of the invention is to provide an automatic toast buttering device which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a top plan view of the toast buttering machine, with the cover removed.

Figure 3 is a sectional view taken on the line 3—3 of Figure 1.

Figure 4 is a fragmentary sectional view taken through one of the valves.

Figure 5 is a perspective view of one of the closure members for the valves.

Figure 1:
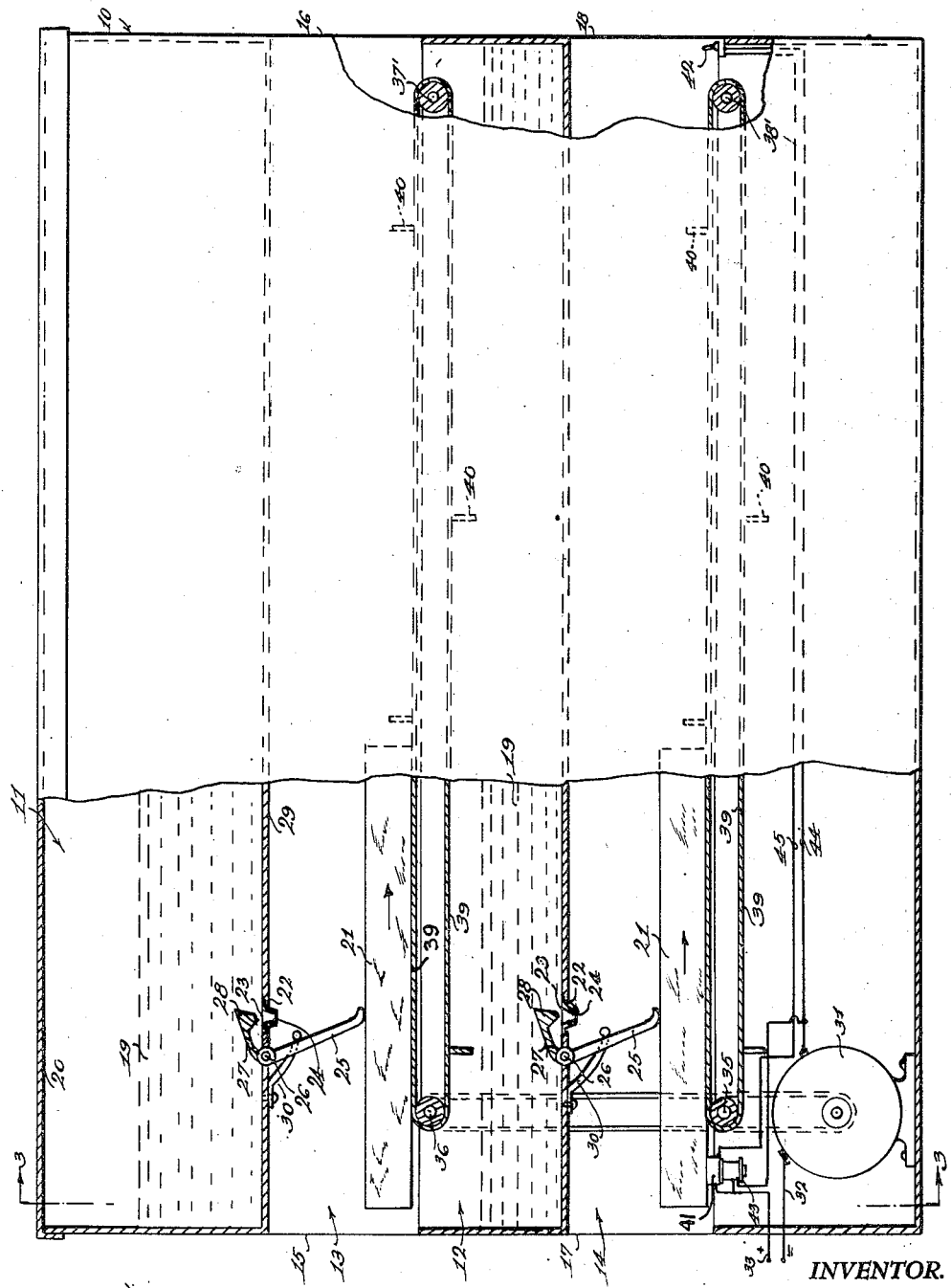
Figure 1 is a side elevational view of the automatic toast buttering device, constructed according to the present invention.

Referring in detail to the drawings, the numeral 10 designates a housing which can be made of any suitable material, and the housing 10 includes compartments or chambers 11 and 12, Figure 1. Arranged below each compartment 11 and 12 is a passageway such as the passageways 13 and 14. The numeral 15 designates the inlet end of the passageway 13, while the numeral 16 designates the outlet end of the passageway 13. Similarly, the numeral 17 designates the inlet end of the passageway 14, while the numeral 18 designates the outlet end of the passageway 14. The compartments 11 and 12 are adapted to hold a suitable quantity of fluid material such as butter, and the upper compartment 11 may have a lid or cover 20 detachably mounted thereon. While the present drawings illustrate two compartments and two passageways, it is to be understood that the number of compartments and passageways can be varied as desired. The numeral 21 designates body members which may be pieces of toast that are adapted to be automatically moved through the passageways whereby the butter 19 will be applied to the body members or toast 21.

Arranged at the bottom of each of the compartments 11 and 12 is a bottom wall 29 which is provided with transversely extending openings 22, and the openings 22 are arranged adjacent the inlet ends of the passageways.

A valve seat 23 is snugly secured or seated within each of the openings 22, and the valve seats 23 may be made of any suitable material such as a yieldable material. Each of the valve seats 23 is provided with an opening 24. A means is provided for automatically dispensing a quantity of the butter 19 onto the toast 21 as the toast 21 moves through the passageways, and this means comprises a lever 25 which has trunnions 26 pivotally connected to the bottom walls 29. As shown in Figure 5, a closure member 27 is formed integral with or secured to each of the levers 25, and each of the closure members 27 includes a wedge shaped portion 28 which is mounted for movement into and out of closing relation with respect to the valve seats 23. Thus, as the toast 21 moves through the passageway, the lower end of the lever 25 is engaged by the toast so that the lever 25 and closure member 27 are pivoted to the position shown in Figure 1 from the position shown in Figure 4, so that the butter 19 can pass by gravity down through the opening 24 on to the moving toast 21 therebelow. A spring member 30 engages each of the levers 25 for maintaining the closure member 27 normally in its closed position with respect to the valve seat 23.

A means is provided for automatically conveying the toast 21 through the passageways, and this means comprises a motor 31 which is adapted to be connected to a suitable source of electrical energy by means of wires 32 and 33, Figure 1. A shaft 34 is operated or driven by the motor 31, and driven shafts 35 and 36 are arranged above the motor 31 and contiguous to the bottom of the passageways 14 and 13, the shafts 35 and 36 being arranged contiguous to the inlet end of the passageways. Endless belts 37 and 38 are trained over pulleys mounted on these shafts, so that as the motor 31 is energized, the shafts 35 and 36 will be rotated, Figure 3. Arranged adjacent the outlet ends 16 and 18 of the passageways 13 and 14, are shafts 37' and 38'. An endless belt 39 is trained over the shaft 36 and over the shaft 37', and a similar endless belt 39 is trained over the shaft 35 and over the shaft 38'. A plurality of blades or lugs 40 are arranged in spaced apart relation, and the lugs 40 are secured to the belts 39. Thus, as the motor 31 is actuated, the belts 39 will travel so that the lugs 40 will move to push the toast 21 through the passageway of the housing.

Switches are provided for controlling the actuation of the motor 31. Thus, arranged adjacent the inlet end 17 of the passageway 14 is a normally open switch 41, and arranged adjacent the outlet end 18 of the passageway 14 is a normally closed switch 42. A relay 43 is provided, and wires 44 and 45 are electrically connected to the normally closed switch 42. The relay 43 is connected in the circuit as shown in Figure 1.

From the foregoing, it is apparent that there has been provided a machine or mechanism or apparatus which will automatically apply material such as the butter 19 to the moving members 21 which may be toast. In use, the pieces of toast 21 may be inserted into the passageways 13 and 14 through the inlet ends 15 and 17. When the piece of toast 21 engages the normally open switch 41, the switch 41 will be closed and thereby complete the circuit to the motor 31. As the motor 31 is energized, it will rotate the shaft 34 and this in turn will cause rotation of the shafts 35 and 36 through the medium of the belts 37 and 38, Figure 3. As the shafts 35 and 36 rotate, the endless belt 39 will be moved or rotated so that the lugs 40 will carry or move the toast 21 longitudinally through the passageways 13. As the toast 21 moves through the passageway it pivots or engages the lower end of the lever 25 to thereby raise the closure member 27 from the position shown in Figure 4 to the position shown in Figure 1 so that some of the fluid butter 19 can flow down through the opening 24 by gravity and on to the toast 21. After the toast 21 has moved past the lever 25, the spring member 30 will return the lever and closure member 27 from the open position of Figure 1 to the closed position of Figure 4 so that no more butter will flow down through the opening 24 until the next piece of toast comes in position. When the lower piece of toast 21 reaches the outlet end 18 of the passageway 14, the toast will engage the normally closed switch 42 to open the switch 42 and thereby deenergize the motor 31 so that the motor 31 will not operate until the next piece of toast is placed in the apparatus. The butter 19 can be placed in the upper compartment 11 by removing the cover 20, and the compartment 12 may be provided with suitable openings whereby the butter 19 can be arranged therein also.

The present invention can be used with or connected to an electric toaster so that the toast will be automatically buttered as it is ejected from the toaster. Thus, a toaster can be altered so that the bread can be put in one end and ejected from the opposite end and hinges can be used for connecting the present invention to such a toaster. The melted butter 19 can be kept heated in any suitable manner, as for example by means of a small electric grill, or else sufficient heat may be provided from the usual toaster. The switch 41 is tripped by the toast and starts the small electric motor 31 which provides the power to move the belt 39 which pull or push the toast through the device. The valve shown in Figure 4 is closed except when the device is being used. The switch 42 automatically shuts off the motor 31 when the buttered toast contacts the switch 42.

I claim:

1. In a device of the character described, a rectangular-shaped housing provided with a plurality of spaced parallel passageways extending longitudinally of said housing for the passage therethrough of body members, said passageways having their ends open to define inlets and outlets, there being a compartment extending longitudinally of said housing and positioned above each of said passageways in parallel relation thereto for holding a quantity of material to be applied to said body members, each of said compartments including a bottom wall provided with a transversely extending opening, a valve seat snugly secured within said opening, a lever pivotally connected to each of said bottom walls, a closure member secured to said lever member and including a wedge shaped portion mounted for movement into and out of closing relation with respect to said valve seat, and means for moving said body members through said passageways.

2. In a device of the character described, a rectangular-shaped housing provided with a plurality of spaced parallel passageways extending longitudinally of said housing for the passage therethrough of body members, said passageways having their ends open to define inlets and outlets, there being a compartment extending longitudinally of said housing and positioned above each of said passageways in parallel relation thereto for holding a quantity of material to be applied to said body members, each of said compartments including a bottom wall provided with a transversely extending opening, a valve seat snugly secured within said opening, a lever pivotally connected to each of said bottom walls, a closure member secured to said lever member and including a wedge shaped portion mounted for movement into and out of closing relation with respect to said valve seat, and means for moving said body members through said passageways, said means comprising a motor mounted in said housing, a drive shaft operated by said motor, a driven shaft arranged contiguous to the lower portion of each of said compartments adjacent the inlet end thereof, belt and pulley means connecting said drive and driven shafts together, stub shafts arranged adjacent the bottom of said passageways contiguous to the outlet ends thereof, endless belts trained over said driven and stub shafts, and a plurality of spaced parallel lugs secured to said last named belts for engaging said body members.

3. The structure as defined in claim 2 and further including a spring member arranged in engagement with each of said levers for maintaining said wedge shaped portions of the closure members normally in closed position with respect to the valve seats.

4. In a device of the character described, a rectangular-shaped housing provided with a plurality of spaced parallel passageways extending longitudinally of said housing for the passage therethrough of body members, said passageways having their ends open to define inlets and outlets, there being a compartment extending longitudinally of said housing and positioned above each of said passageways in parallel relation thereto for holding a quantity of material to be applied to said body members, each of said compartments including a bottom wall provided with a transversely extending opening, a valve seat snugly secured within said opening, a lever pivotally connected to each of said bottom walls, a closure member secured to said lever member and including a wedge shaped portion mounted for movement into and out of closing relation with respect to said valve seat, and means for moving said body members through said passageways, said means comprising a motor mounted in said housing, a drive shaft operated by said motor, a driven shaft arranged contiguous to the lower portion of each of said compartments adjacent the inlet end thereof, belt and pulley means connecting said drive and driven shafts together, stub shafts arranged adjacent the bottom of said passageways contiguous to the outlet ends thereof, endless belts trained over said driven and stub shafts, and a plurality of spaced parallel lugs secured to said last named belts for engaging said body members, spring members connected to said levers, a normally open switch arranged adjacent the lower front end of one of said passageways, and a normally closed switch arranged adjacent the lower front end of said last named passageway, said switches being electrically connected to said motor.

References Cited in the file of this patent

UNITED STATES PATENTS

| | | |
|---|---|---|
| 401,771 | Bain | Apr. 23, 1889 |
| 503,525 | Buchanan | Aug. 15, 1893 |
| 1,312,857 | Lindsley | Aug. 12, 1919 |
| 1,885,453 | Larson | Nov. 1, 1932 |
| 1,911,965 | Perez | May 30, 1933 |
| 1,917,767 | Larson | July 11, 1933 |